US 12,202,385 B2
(12) United States Patent
Motozaki et al.

(10) Patent No.: US 12,202,385 B2
(45) Date of Patent: Jan. 21, 2025

(54) SEAT SLIDE DEVICE (71) Applicants: Mitsuboshi Belting Ltd., Kobe (JP); Toyota Body Seiko Co., Ltd., Takahama (JP)

(72) Inventors: Akihiko Motozaki, Hyogo (JP); Susumu Osaki, Hyogo (JP); Motohisa Nakamura, Takahama (JP); Shin Shiraki, Takahama (JP); Takayuki Ogasawara, Takahama (JP)

(73) Assignees: Mitsuboshi Belting Ltd., Kobe (JP); Toyota Body Seiko Co., Ltd., Takahama (JP)

( * ) Notice: Subject to any disclaimer, the term of this patent is extended or adjusted under 35 U.S.C. 154(b) by 355 days.

(21) Appl. No.: 17/041,793

(22) PCT Filed: Apr. 24, 2019

(86) PCT No.: PCT/JP2019/017526
§ 371 (c)(1),
(2) Date: Sep. 25, 2020

(87) PCT Pub. No.: WO2019/208667
PCT Pub. Date: Oct. 31, 2019

(65) Prior Publication Data
US 2021/0362628 A1 Nov. 25, 2021

(30) Foreign Application Priority Data

Apr. 27, 2018 (JP) .................................. 2018-087270
Apr. 15, 2019 (JP) .................................. 2019-077064

(51) Int. Cl.
*B60N 2/06* (2006.01)
*B60N 2/07* (2006.01)

(52) U.S. Cl.
CPC ........... *B60N 2/067* (2013.01); *B60N 2/0705* (2013.01)

(58) Field of Classification Search
CPC .................. B60N 2/067; B60N 2/0705; B60N 2002/0236
See application file for complete search history.

(56) References Cited

U.S. PATENT DOCUMENTS

2020/0086767 A1* 3/2020 Ogasawara .......... B60N 2/0715

FOREIGN PATENT DOCUMENTS

CN          2552758 Y       5/2003
DE      102011011505 A1     8/2012
(Continued)

OTHER PUBLICATIONS

See all pages (Year: 1998).*
(Continued)

*Primary Examiner* — Kimberly T Wood
(74) *Attorney, Agent, or Firm* — Banner & Witcoff, Ltd.

(57) ABSTRACT

The present invention pertains to a seat slide device having: a lower rail fixed above a floor and extending in one direction; an upper rail connected to a seat and capable of moving along the lower rail; a drive pulley connected to a drive source and attached to the seat or the upper rail; an ended belt wound on the drive pulley so that one surface contacts the drive pulley, both ends of the ended belt being fixed to the floor or the lower rail; and a first and second pressing member attached to a position on the floor side of the seat or the upper rail closer than the drive pulley, each pressing member contacting the other surface of the ended belt, and the first pressing member, the drive pulley, and the second pressing member being disposed in the stated order along the one direction.

15 Claims, 8 Drawing Sheets (56) References Cited

FOREIGN PATENT DOCUMENTS

| JP | S55-011391 U | 1/1980 |
| JP | H04-079731 U | 7/1992 |
| JP | H06-092169 A | 4/1994 |
| JP | H11-020582 A | 1/1999 |
| JP | 2016-215931 A | 12/2016 |
| JP | 2018501152 A * | 12/2016 |
| JP | 2017-114291 A | 6/2017 |

OTHER PUBLICATIONS

Feb. 8, 2022—(CN) Notification of First Office Action—App 201980019441.7.
Jun. 11, 2019—International Search Report—Intl App PCT/JP2019/017526.

* cited by examiner

(a) Winding angle: 90 degrees

Upper side ↕ Lower side (b) Winding angle: 240 degrees

Upper side ↕ Lower side

SEAT SLIDE DEVICE

CROSS REFERENCE TO RELATED APPLICATIONS

This is a U.S. National Phase Application under 35 U.S.C. § 371 of International Application No. PCT/JP2019/017526, filed Apr. 24, 2019, which claims priority to Japanese Application Nos. 2018-087270, filed Apr. 27, 2018 and 2019-077064, filed Apr. 15, 2019, which was published Under PCT Article 21 (2), the entire contents of which are incorporated herein by reference.

TECHNICAL FIELD

The present invention relates to a seat slide device.

BACKGROUND ART

A seat slide device is a device to slide a seat of an automobile to move in a front-rear direction of the vehicle relative to a floor. In general, the seat slide device includes a lower rail fixed to the floor and an upper rail coupled to the seat. The upper rail is slid relative to the lower rail by a drive mechanism including a motor or the like so that the seat is slid relative to the floor. In a three-row seat vehicle such as a minivan that is an automobile, a slide movement of a second-row seat in the middle usually has a longer moving distance than those of a driver seat, a front passenger seat, and a third-row seat.

A conventional seat slide device generally uses a mechanical element such as a screw mechanism or a rack-and-pinion as a drive mechanism that moves the upper rail. For example, in an example of Patent Literature 1, a fixing member including a female screw portion is attached to a lower rail on a fixed side and a rod including a male screw portion is attached to an upper rail on a movable side. When the rod is rotated by a motor, the upper rail moves relative to the lower rail due to the action of the male screw portion and the female screw portion. In another example, a rack gear is attached to the upper rail on the movable side and a pinion gear is attached to the lower rail on the fixed side. When the pinion gear is rotated by a motor, the upper rail provided with the rack gear moves relative to the lower rail.

Patent Literature 2 discloses a drive mechanism for a seat slide device using a belt. A pair of pulleys are provided under a seat. The belt is wound around the pulleys. The seat is coupled to the belt. When the pulleys are driven by a motor, the seat slides in a front-rear direction of a vehicle to move relative to a floor as the belt runs.

Patent Literature 3 discloses a drive mechanism using a wire. A winch, on which the wire is wound, is attached to a seat and an upper rail on a movable side. A spiral groove for the wire to wind on is formed on a surface of the winch. On the other hand, a wire rail is fixed to a floor along with a lower rail. The wire is wound around the winch for plural times in a longitudinal direction of the winch along the spiral groove on the surface of the winch. Both ends of the wire are fixed to both ends of the wire rail in a longitudinal direction of the wire rail. When the winch is rotated by a motor, the wire on one end side is wound on the winch while the wire on the other end side is drawn out of the winch. Accordingly, the upper rail integrated with the winch slides to move relative to the lower rail.

CITATION LIST

Patent Literature

Patent Literature 1: JP-UM-S55-11391
Patent Literature 2: JP-UM-H04-79731
Patent Literature 3: JP-A-2017-114291

SUMMARY OF INVENTION

Technical Problem

In the device of Patent Literature 1 using a mechanical element such as a screw or a gear, metal members engage with each other when the seat is slid, and accordingly noise is generated. Since many metal components are used, a weight of the entire device is large and a weight of a vehicle body also increases. Furthermore, it is necessary for the rod of the screw mechanism and the rack gear of the rack-and-pinion to have a length corresponding to a distance by which the seat moves. Accordingly, a size of the seat slide device may increase in the case where the moving distance of the seat is long, which is a problem.

In Patent Literature 2, it is necessary for the pulleys, the motor, or the like that drive the belt to be installed under the seat. For this reason, a space for feet of an occupant may be narrow, which is a problem.

In Patent Literature 3, the wire is used to slide the seat. The wire has a length corresponding to a distance by which the seat slides, and is wound around the winch for plural times in an axial direction of the winch. For this reason, it is necessary to increase a winding area of the winch as a moving distance of the seat becomes long, which increases a size of the winch. Furthermore, since the wire is wound around the winch for plural times, the wire is bent and fatigued with rotation of the winch. That is, there is a problem also in terms of durability.

Furthermore, the spiral groove on the surface of the winch is not orthogonal to a rotation axis of the winch but inclined relative to a circumferential direction of the winch. Accordingly, the wire may not properly fit into the groove of the winch. Even when the wire properly fits, noise generated when the wire is wound around the winch may be large and the wire and the winch may be easily impaired, which is a problem.

An object of the present invention is to provide a seat slide device that has a simple configuration using a belt and can be compactly accommodated in a seat or a rail.

Solution to Problem

The seat slide device of the present invention includes: a lower rail fixed on a floor and extending in one direction; an upper rail coupled to a seat and movable along the lower rail; a drive pulley connected to a drive source and attached to the seat or the upper rail; an ended belt wound around the drive pulley so that one surface of the ended belt is in contact with the drive pulley, and having both ends fixed to the floor or the lower rail; and a first pressing member and a second pressing member that are attached to positions closer to the floor than the drive pulley in the seat or the upper rail, and are both in contact with another surface of the ended belt, in which the first pressing member, the drive pulley, and the second pressing member are arranged in this order in the one direction.

Since the both ends of the ended belt wound around the drive pulley are fixed to the floor or the lower rail, when the drive pulley is rotated by the drive source, the seat and the upper rail, to which the drive pulley is connected, move integrally relative to the lower rail. Furthermore, since each of the first pressing member and the second pressing member is in contact with a corresponding portion of the ended belt on both sides of the drive pulley, a winding angle of the belt relative to the drive pulley is ensured at a certain degree or more.

The seat slide device of the present invention mainly uses a belt and a pulley, and can be reduced in weight than a conventional configuration in which many mechanical components are used. The seat slide device is less likely to generate noise or the like due to contact of metal members. The size of the seat slide device can be reduced since only the belt needs to be lengthened even in the case where a moving distance of the seat is long. Unlike the case of using a wire, the drive pulley does not increase in size even in the case where the belt is long since the belt is not wound around the drive pulley for plural times. Furthermore, the bending fatigue is not a serious problem.

The drive pulley and the pressing members that occupy a large part in terms of size in a drive mechanism of the seat slide device are attached to the seat or the upper rail. For this reason, the drive pulley and the pressing members can be accommodated in the seat or the upper rail. Therefore, a space in which an occupant sits, including a foot space is not compressed.

In the seat slide device of the present invention, the drive source is preferably entirely accommodated in the seat.

According to this configuration, a space in which the occupant sits, including a foot space of the occupant is not narrowed due to the drive source. In addition, noise generated when the drive source is operating is blocked by the seat and the quietness is improved. Furthermore, since there are fewer foreign matters in the seat than outside the seat, the foreign matters are less likely to enter the drive source.

In the seat slide device of the present invention, the drive source may be a motor, and a sliding movement of the seat in the one direction may be switched by switching the rotation direction of the motor.

In the seat slide device of the present invention, the drive pulley is preferably accommodated in the seat.

According to this configuration, the space in which the occupant sits, including the foot space of the occupant is not narrow due to the drive pulley. In addition, noise generated when the drive pulley is rotating is blocked by the seat and the quietness is improved. Furthermore, since there are fewer foreign matters in the seat than outside the seat, the foreign matters are less likely to be caught between the drive pulley and the ended belt.

In the seat slide device of the present invention, the first pressing member and the second pressing member are preferably accommodated in the upper rail.

According to this configuration, the space in which the occupant sits, including the foot space of the occupant is not narrow due to the pressing members. In addition, contact noise between the pressing members and the belt is blocked by the upper rail and the quietness is improved. Furthermore, since there are fewer foreign matters in the upper rail than outside the upper rail, the foreign matters are less likely to be caught between the pressing members and the ended belt.

In the seat slide device of the present invention, the first pressing member and the second pressing member are preferably idler pulleys that are driven to rotate following the movement of the belt.

According to this configuration, resistance between the ended belt and the pressing members decreases, and the sliding movement of the seat is smooth. Furthermore, wearing of the belt is also reduced.

In the seat slide device of the present invention, the ended belt is preferably entirely accommodated in a space surrounded by the seat, the upper rail, and the lower rail.

According to this configuration, a space in which the occupant sits, including a foot space of the occupant is not narrow due to the ended belt. In the case where the ended belt is partially not accommodated in the space surrounded by the seat, the upper rail, and the lower rail, that is, in the case where the ended belt includes a portion that is not inside the lower rail, the seat, nor the upper rail, foreign matters may adhere to the ended belt and the foreign matters may enter the space surrounded by the seat, the upper rail, and the lower rail. However, in the case where the ended belt is entirely accommodated in the space surrounded by the seat, the upper rail, and the lower rail, foreign matters are less likely to enter the space surrounded by the seat, the upper rail, and the lower rail.

In the seat slide device of the present invention, a belt body of the ended belt is preferably formed of a rubber composition.

According to this configuration, it is possible to reduce noise generated when the ended belt comes into contact with other components such as the drive pulley and the pressing members, thereby improving the quietness.

In the seat slide device of the present invention, the drive pulley preferably has a plurality of tooth grooves arranged in a circumferential direction on a circumferential surface of the drive pulley, and the ended belt is preferably a toothed belt having a plurality of tooth portions corresponding to the tooth grooves, formed on a surface that is in contact with the drive pulley.

According to this configuration, since the tooth portions of the ended belt mesh with the tooth grooves of the drive pulley, power can be transmitted from the drive pulley to the ended belt with high power transmission efficiency without slippage and the seat can be smoothly slid.

In the seat slide device of the present invention, a width of the ended belt is preferably 80% or more and 99% or less of a width of the drive pulley.

According to this configuration, since the width of the ended belt is increased as much as possible within a range that does not exceed the width of the drive pulley, the transmission power from the drive pulley to the ended belt is increased and the seat is smoothly slid.

In the seat slide device of the present invention, a winding angle of the ended belt to the drive pulley is preferably 90 degrees or more and 240 degrees or less.

It is required to improve the transmission power from the drive pulley to the ended belt, to reduce and decline noise generated due to the meshing of the drive pulley and the ended belt during running of the ended belt, and to increase the durability of the drive pulley and the ended belt. More specifically, from a viewpoint of increasing a contact area between the ended belt and the drive pulley and increasing the transmission power from the drive pulley to the ended belt, the winding angle is preferably large and is preferably 90 degrees or more. From a viewpoint of preventing noise generated when the ended belt and the drive pulley come into contact with or separate from each other and improving the quietness and the durability, the winding angle is preferably small and is preferably 240 degrees or less.

The seat slide device of the present invention preferably includes a lock mechanism that restricts the sliding movement of the seat.

The seat slide device of the present invention includes: a lower rail fixed on a floor and extending in one direction; an upper rail coupled to a seat and movable along the lower rail; a drive pulley connected to a drive source and attached to the floor or the lower rail; an ended belt wound around the drive pulley so that one surface of the ended belt is in contact with the drive pulley, and having both ends fixed to the seat or the upper rail; and a first pressing member and a second pressing member that are attached to positions closer to the seat than the drive pulley on the floor or the lower rail, and are both in contact with another surface of the ended belt, in which the first pressing member, the drive pulley, and the second pressing member are arranged in this order in the one direction.

Since the drive pulley is attached to the floor or the lower rail, when the drive pulley is rotated by the drive source, the seat and the upper rail, to which the both ends of the ended belt are fixed, move integrally relative to the lower rail. Furthermore, since each of the first pressing member and the second pressing member is in contact with a corresponding portion of the ended belt on both sides of the drive pulley, a winding angle of the belt relative to the drive pulley is ensured at a certain degree or more.

The same effect is obtained as in the case where the first pressing member and the second pressing member are attached to the seat or the upper rail at positions closer to the floor than the drive pulley, and the first pressing member, the drive pulley, and the second pressing member are arranged in this order along the one direction.

Advantageous Effects of Invention

According to the present invention as described above, it is possible to obtain a seat slide device that has a simple configuration using a belt and can be compactly accommodated in a seat or a rail.

DESCRIPTION OF EMBODIMENTS

A seat slide device 2 according to an embodiment of the present invention will be described below.
(Seat Slide Device 2)

Figure 1:
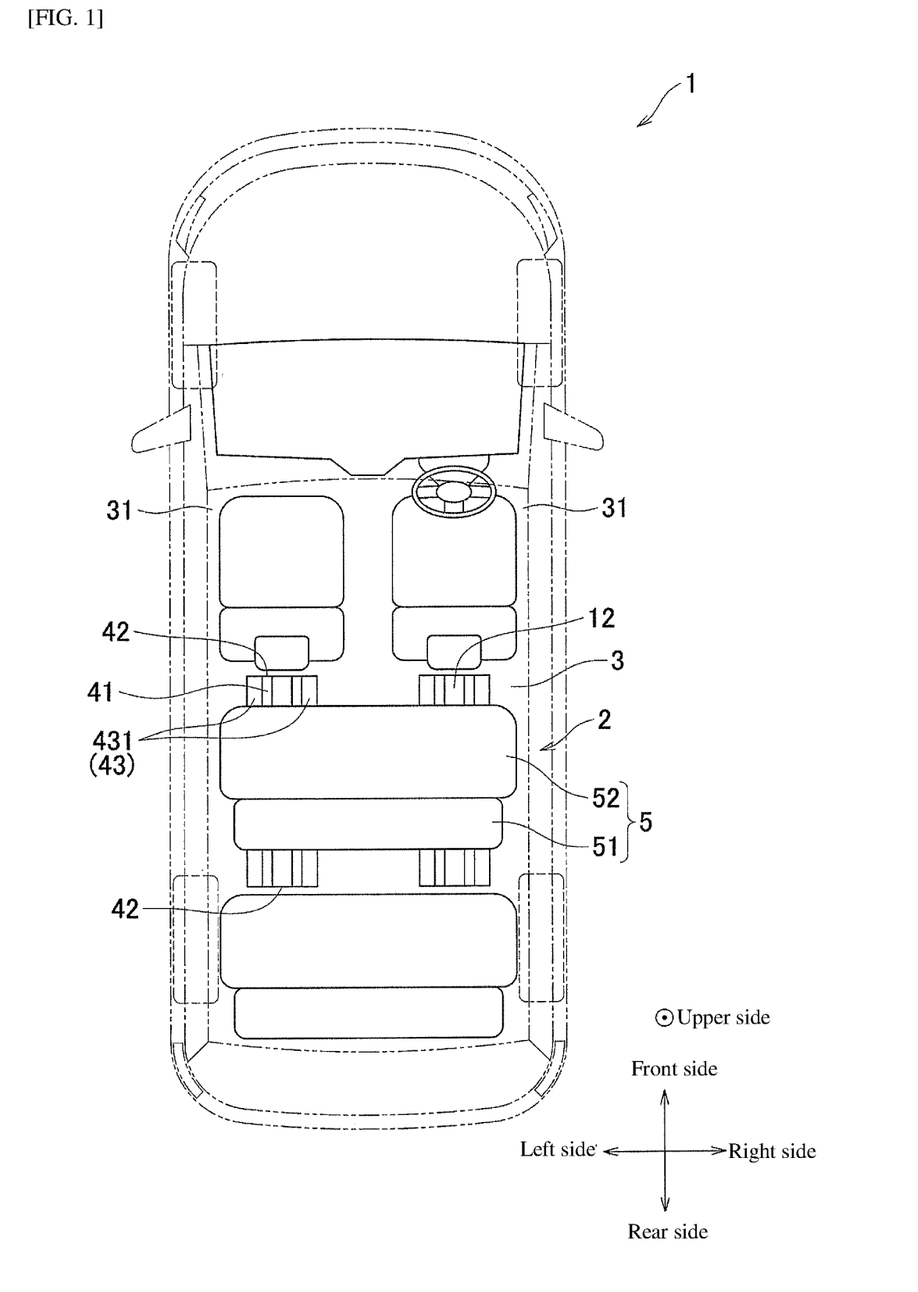
FIG. 1 is a top view of a vehicle including a seat slide device according to the present embodiment.

As illustrated in FIG. 1, the seat slide device 2 according to the present embodiment is applied to a seat slide device that electrically slides a second-row seat 5 of a three-row seat vehicle 1 of a minivan that is an automobile, to move in a front-rear direction of the vehicle 1 relative to a floor 3.

Hereinafter, a case where the seat 5 is slid in the front-rear direction of the vehicle will be described as a specific example. However, a seat moving direction of the seat slide device is not limited to the front-rear direction of the vehicle. The direction in which the seat slide device slides the seat may be any one direction. Furthermore, the seat slide device is not limited to being installed in a vehicle. The seat slide device may be installed on a floor other than in a vehicle.

Figure 2:
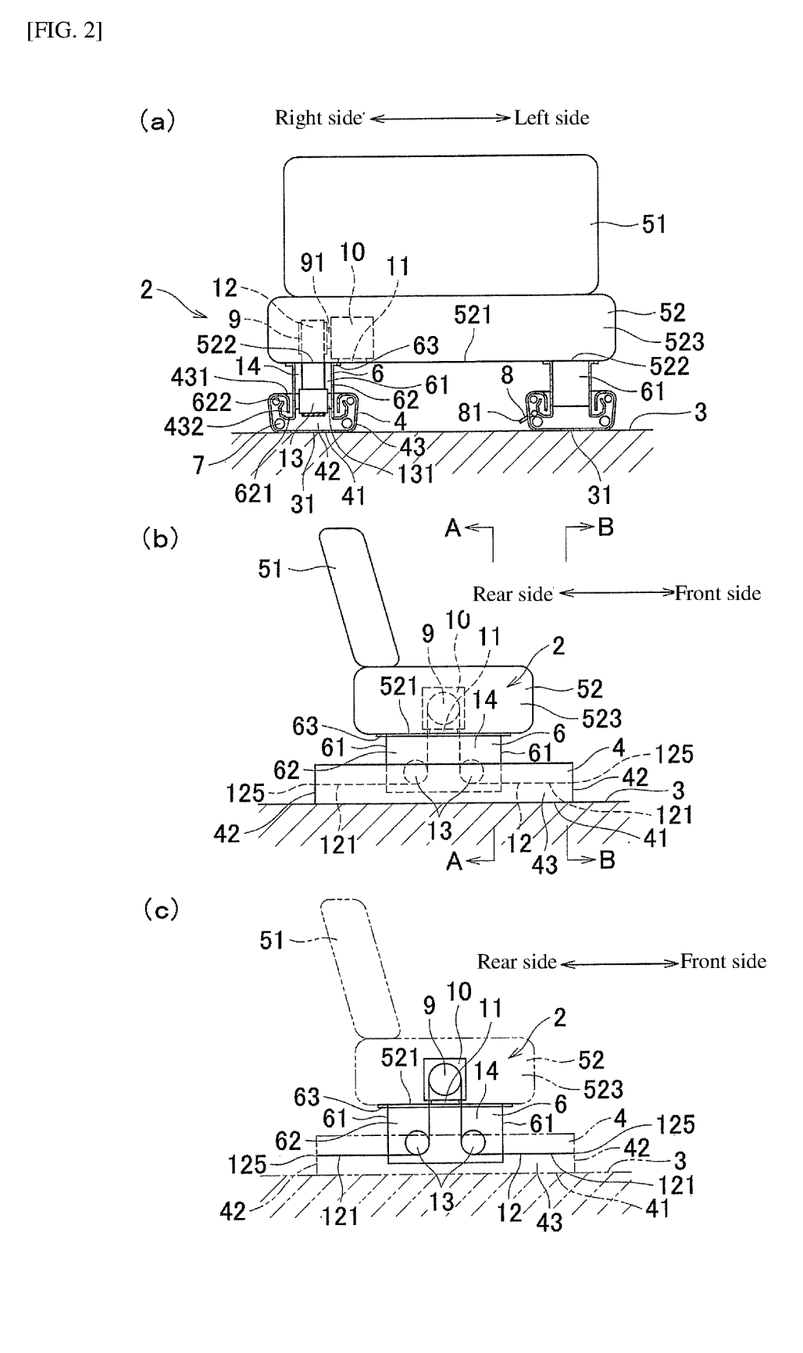
FIG. 2 includes views illustrating a seat and the seat slide device; (a) of FIG. 2 is a cross-sectional view taken along a line A-A in (b) of FIG. 2; (b) of FIG. 2 is a right-side view; and (c) of FIG. 2 is a view illustrating a main portion of the seat slide device in (b) of FIG. 2.

As illustrated in (a) to (c) of FIG. 2, the seat slide device 2 includes a pair of left and right lower rails 4 fixed on the floor 3, a pair of left and right upper rails 6 coupled to the seat 5 and slidable relative to the lower rails 4, a drive pulley 9 rotatably attached to the seat 5, idler pulleys 13 rotatably attached to the upper rail 6, and an ended belt 12 wound around the drive pulley 9 and the idler pulleys 13 and having both ends 121 fixed to the lower rail 4. The seat 5 includes a backrest 51 and a sitting portion 52. The sitting portion 52 of the seat 5 has a cavity 523 inside. A person (hereinafter, referred to as an occupant) sits to face the forward direction of the vehicle 1.
(Lower Rails 4)

As illustrated in (a) to (c) of FIG. 2, each of the lower rails 4 includes a lower rail bottom portion 41, two lower rail end portions 42 facing each other in the front-rear direction of the vehicle 1, and two lower rail side portions 43 facing each other in a left-right direction of the vehicle 1. As illustrated in (a) of FIG. 2, upper end portions 431 of the two lower rail side portions 43 facing each other in the left-right direction of the vehicle 1 bend toward inside of the rail. Distal ends 432 of the upper end portions 431 face downward. The height of an uppermost position of the lower rail end portions 42 coincides with the height of an uppermost position of the upper end portions 431 of the lower rail side portions 43. As illustrated in FIG. 1, the lower rails 4 are fixed to the floor 3 by bolts so that the longitudinal direction of the lower rails 4 coincides with the front-rear direction of the vehicle 1. Accordingly, the lower rails 4 and the floor 3 are integrated. The pair of the left and right lower rails 4 are fixed to the respective left and right end portions 31 of the floor 3 of the vehicle 1. The two lower rails 4 are arranged in parallel. The lower rails 4 are made of, for example, metal.
(Upper Rails 6)

As illustrated in (a) to (c) of FIG. 2, each of the upper rails 6 includes two upper rail end portions 61 facing each other in the front-rear direction of the vehicle 1, two upper rail side portions 62 facing each other in the left-right direction of the vehicle 1, and four upper portions 63 extending outward of the upper rail 6 from the two upper rail end portions 61 facing each other in the front-rear direction of the vehicle 1 and from the two upper rail side portions 62 facing each other in the left-right direction of the vehicle 1. As illustrated in (a) of FIG. 2, lower end portions 621 of the two upper rail side portions 62 facing each other in the left-right direction of the vehicle 1 bend outward of the upper rail 6. Distal ends 622 of the lower end portions 621 face upward. The bent lower end portions 621 of the upper rail 6 fit the similarly-bent upper end portions 431 of the lower rail 4. The upper rails 6 are fixed to the sitting portion 52 of the seat 5 so that the longitudinal direction of the upper rails 6 coincides with the front-rear direction of the vehicle 1. The pair of upper rails 6 are fixed to the respective left and right end portions 522 of a seat bottom portion 521 of the sitting portion 52. The two upper rails 6 are arranged in parallel. As illustrated in (a) of FIG. 2, the pair of upper rails 6 are fixed to the sitting portion 52 of the seat 5 by fixing the four upper portions 63 of each of the upper rails 6 and the seat bottom portion 521 with bolts. As described above, the upper rails 6 and the seat 5 are integrated.

As illustrated in (a) of FIG. 2, the upper rails 6 are slidable along the lower rails 4 via balls 7. Bearings may be disposed between the lower rails 4 and the upper rails 6. Although the bearings or balls may be not disposed between the lower rails 4 and the upper rails 6, sliding of the lower rails 4 and the upper rails 6 is facilitated when the balls or bearings are disposed. The upper rails 6 are made of, for example, metal. Furthermore, a rail cover may be provided to prevent foreign matters from entering from gaps between the lower rails 4 and the upper rails 6.

(Lock Mechanism)

As illustrated in (a) of FIG. 2, the seat slide device 2 includes a lock mechanism capable of restricting the upper rails 6 from sliding in the front-rear direction of the vehicle 1 relative to the lower rails 4, that is, fixing a position of the seat 5 relative to the floor 3. The lock mechanism includes a claw member 8 rotatably attached to a rail outer surface at a center in the left-right direction of the vehicle 1 of the lower end portion 621 of the right upper rail side portion 62 of the two upper rail side portions 62 facing each other in the left-right direction of the vehicle 1 of the upper rail 6 on the left side of the vehicle 1. When an end portion 81 of the claw member 8 is inserted into a lock hole formed in the right lower rail side portion 43 of the two lower rail side portions 43 facing each other in the left-right direction of the vehicle 1 of the lower rail 4 on the left side of the vehicle 1, the upper rails 6 cannot slide in the front-rear direction of the vehicle 1 relative to the lower rails 4 and the seat slide device 2 is in a locked state. A plurality of lock holes are formed in the lower rail 4 at equal intervals in the front-rear direction of the vehicle 1. Accordingly, by changing the lock hole through which the end portion 81 of the claw member 8 is inserted, it is possible to change a relative fixing position of the seat 5 to the floor 3.

(Drive Pulley 9 and Motor 10)

As illustrated in (a) of FIG. 2, the motor 10 serving as a drive source is directly connected to a rotation shaft 91 of the drive pulley 9. The motor 10 is rotatable clockwise and counterclockwise. When the motor 10 rotates clockwise, the drive pulley 9 also rotates clockwise, and when the motor 10 rotates counterclockwise, the drive pulley 9 also rotates counterclockwise. In the following description, as illustrated in (b) and (c) of FIG. 2, a clockwise direction and a counterclockwise direction when viewed from the right side of the vehicle 1 are defined as "clockwise" and "counterclockwise".

As illustrated in (a) to (c) of FIG. 2, the drive pulley 9 is rotatably attached to the seat 5 via the motor 10, and is accommodated in the cavity 523 of the sitting portion 52 of the seat 5. The drive pulley 9 is disposed at a center of the seat 5 in the front-rear direction of the vehicle 1 and above the upper rail 6 on the right side of the vehicle 1. The motor 10 is fixed to the right end portion 522 of the seat bottom portion 521 of the sitting portion 52 of the seat 5 via a bracket 11. The motor 10 is accommodated in the cavity 523 of the sitting portion 52 of the seat 5 and is disposed inward of the drive pulley 9 in the seat 5. The drive pulley 9 may be connected to the motor 10 via a speed reduction device that lowers a rotation speed of the motor 10 to increase torque. In this case, the speed reduction device is preferably accommodated in the seat 5.

Figure 3:
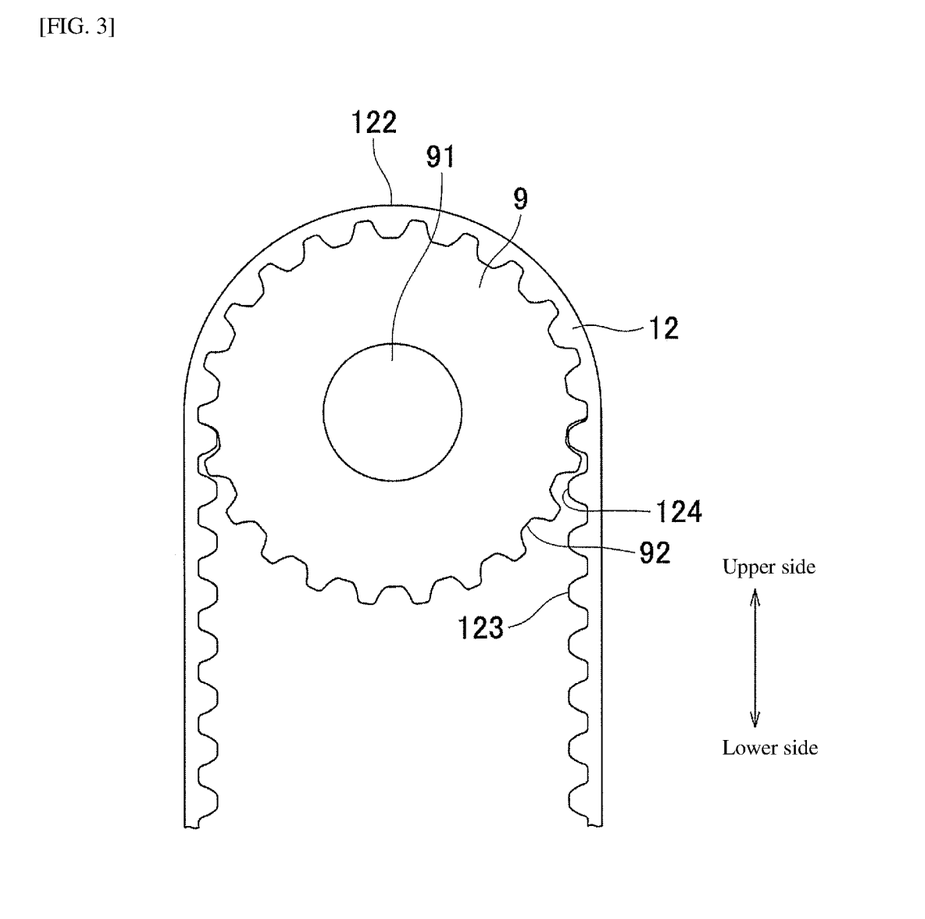
FIG. 3 is a view illustrating a drive pulley that engages with an ended belt.

As illustrated in FIG. 3, the drive pulley 9 is a toothed pulley and a plurality of tooth grooves 92 arranged in a circumferential direction of the drive pulley 9 are formed on a circumferential surface of the drive pulley 9. The drive pulley may be a flat pulley having a flat circumferential surface or a ribbed pulley engraved with a plurality of V-shaped rib grooves extending in the circumferential direction of the pulley. The circumferential surface of the drive pulley 9 may be made of metal, and may be made of a resin or a rubber composition.

(Ended Belt 12)

As illustrated in (b) and (c) of FIG. 2, the both ends 121 of the ended belt 12 are fixed to the lower rail 4. The fixing of the ended belt 12 to the lower rail 4 will be described later in detail. Each of distal ends 125 of the both ends 121 of the ended belt 12 is in contact with a corresponding one of centers of the two lower rail end portions 42 facing each other in the front-rear direction of the vehicle 1 of the lower rail 4. As illustrated in (a) to (c) of FIG. 2, the ended belt 12 is wound around the drive pulley 9 and the two idler pulleys 13. The rotation shaft 91 of the drive pulley 9 and rotation shafts 131 of the two idler pulleys 13 are all parallel to each other. The ended belt 12 is wound around the pulleys in a manner of being orthogonal to the rotation shafts 91, 131. As illustrated in (a) to (c) of FIG. 2, the lower ends 621 of the upper rail end portions 61 facing each other in the front-rear direction of the upper rail 6 are located above the fixing positions of the ended belt 12. The right end portion 522 of the seat bottom portion 521 of the sitting portion 52 has two openings (not illustrated) for the ended belt 12 to pass through. Accordingly, there is no obstacle for the ended belt 12 to be wound around the drive pulley 9 and the two idler pulleys 13. As illustrated in (a) to (c) of FIG. 2, the ended belt 12 is entirely accommodated in a space 14 surrounded by the seat 5, the upper rail 6, and the lower rail 4.

As illustrated in FIG. 3, the ended belt 12 is a toothed belt having a lower surface 123 with a plurality of tooth portions 124 corresponding to the tooth grooves 92 formed on the circumferential surface of the drive pulley 9, and an upper surface 122 of a flat surface. The ended belt is not limited to a toothed belt. For example, in the case where the drive pulley is a flat pulley, the ended belt may be a flat belt, and in the case where the drive pulley is a ribbed pulley, the ended belt may be a V-ribbed belt. The belt width of the ended belt 12 is 80% to 99% of the width of the drive pulley 9.

As illustrated in FIG. 3, the tooth portions 124 on the lower surface 123 of the ended belt 12 mesh with the tooth grooves 92 on the circumferential surface of the drive pulley 9. As illustrated in (b) and (c) of FIG. 2 and FIG. 3, a winding angle of the ended belt 12 to the drive pulley 9 is 180 degrees and is ensured at a certain degree or more. As illustrated in (b) and (c) of FIG. 2, the ended belt 12 is in contact with the two idler pulleys 13 on the upper surface

122. Winding angles of the ended belt 12 to the two idler pulleys 13 are both 90 degrees.

The ended belt 12 includes a belt body made of a rubber composition, and a tension member. The lower surface 123 having the tooth portions 124 formed thereon and the upper surface 122 that is a flat surface may be covered with a cover fabric made of fabric. As the tension member, use can be made of a canvas or a cord (twisted cord). Examples of the cord may include twisted cords of polyester fibers (polyethylene terephthalate fibers, polyethylene naphthalate fibers, etc.), polyamide fibers, aramid fibers, glass fibers, carbon fibers, metal fibers, and the like. Twisted cords of aramid fibers, glass fibers, carbon fibers, and metal fibers are particularly preferable in terms of high tensile strength and small elongation.

As a rubber component of the rubber composition constituting the belt body, use can be made of a vulcanizable or crosslinkable rubber. Specific examples of the rubber component include diene rubbers (natural rubber, isoprene rubber, butadiene rubber, chloroprene rubber, styrene-butadiene rubber, acrylonitrile-butadiene rubber (nitrile rubber), hydrogenated nitrile rubber, etc.), ethylene-α-olefin elastomers, chlorosulfonated polyethylene rubbers, alkylated chlorosulfonated polyethylene rubbers, epichlorohydrin rubbers, acrylic rubbers, silicone rubbers, urethane rubbers, fluororubbers, and the like. These rubber components may be used alone or in combination of two or more thereof. Among these, a mixture of natural rubber and styrene-butadiene rubber, chloroprene rubber, ethylene-α-olefin elastomer, hydrogenated nitrile rubber, urethane rubber, and the like may be suitably used. If necessary, a vulcanizing agent or a crosslinking agent, a co-crosslinking agent, a vulcanization aid, a vulcanization accelerator, a vulcanization retarder, a metal oxide (zinc oxide, magnesium oxide, calcium oxide, barium oxide, iron oxide, copper oxide, titanium oxide, aluminum oxide, etc.), a reinforcing agent (carbon black, silicon oxide such as hydrous silica, etc.), a short fiber, a filler (clay, calcium carbonate, talc, mica, etc.), a softener (oil such as paraffin oil and naphthenic oil, etc.), a processing agent or a processing aid (stearic acid, stearic acid metal salt, wax, paraffin, etc.), an aging inhibitor (an antioxidant, a thermal aging inhibitor, a bending crack inhibitor, an antiozonant, etc.), a colorant, a tackifier, a plasticizer, a coupling agent (silane coupling agent, etc.), a stabilizer (a UV absorber, a thermal stabilizer, etc.), a flame retardant, an antistatic agent, and the like may be blended in the rubber composition. The metal oxide may be blended as a crosslinking agent.

As the ended belt 12, a toothed belt is preferably used. The toothed belt has a limit in power that can be transmitted depending on tooth profile, tooth pitch, and belt width. Hereinafter, preferred combinations will be described.

As the tooth profile, any of a trapezoidal tooth profile (MXL, XXL, XL, L, H, XH, and XXH) defined by JIS B 1856 (2018) and ISO 5294 (1989) and an arc tooth profile (H, P, S, R, and G) defined by JIS B 1857-1 (2015) and ISO 13050 (2014) can be used.

In the case of the trapezoidal tooth profile, the tooth profile and the tooth pitch (distance between centers of teeth adjacent to each other in a belt length direction) inseparably correspond to each other. On the other hand, in the case of the arc tooth profile, different tooth pitches can be selected in the same tooth profile, and accordingly, types are specified in a combination of the tooth profile and the tooth pitch. In the same tooth profile, the larger the tooth pitch is, the larger the tooth size (tooth height, tooth width, and the like) is and the larger the transmission capacity is.

The tooth pitch can be selected, for example, in a range of 2 to 10 mm Examples of the trapezoidal tooth profile corresponding to this range include MXL (tooth pitch of 2.032 mm), XXL (tooth pitch 3.175 mm), XL (tooth pitch of 5.08 mm), and L (tooth pitch of 9.525 mm). In the case of the arc tooth profile, examples of types include H3M, P3M, S3M, R3M (each tooth pitch of 3 mm), HSM, PSM, SSM, R5M (each tooth pitch of 5 mm), and H8M, PBM, S8M, R8M, G8M (each tooth pitch of 8 mm). Furthermore, a manufacturer unique type (e.g., S2M: tooth pitch of 2 mm and S4.5M: tooth pitch of 4.5 mm, etc.) that is not specified in the above-mentioned standard can be used.

The tooth size is preferably large from a viewpoint of improving transmission capacity and durability. On the other hand, the tooth size is preferably small in terms of space saving. For this reason, in the case of the trapezoidal tooth profile, the tooth profile is preferably XXL, XL, and L, and in the case of the arc tooth profile, the tooth pitch is preferably 3 to 8 mm (in particular, 3 to 5 mm). Among these, S3M, SSM, and S8M (in particular, S5M) are preferable since interference between the belt and the pulleys can be reduced and durability and quietness can be improved.

The belt width may be appropriately set according to the required transmission capacity, tooth profile, and tooth pitch. For example, the belt width may be about 4 to 30 mm, preferably 5 to 26 mm (particularly 6 to 24 mm), and more preferably 8 to 22 mm (particularly 10 to 20 mm).

(Idler Pulleys 13)

The idler pulleys 13 are driven to rotate following the movement of the wound belt.

As illustrated in (a) to (c) of FIG. 2, each of both ends of the rotation shaft 131 of the two idler pulleys 13 is fixed to a corresponding one of the upper rail side portions 62 facing each other in the left-right direction of the upper rail 6 on the right side of the vehicle 1. The idler pulleys 13 are rotatably attached to the upper rail 6 so that the rotation shaft 91 of the drive pulley 9 and the rotation shafts 131 are parallel to each other. Both of the two idler pulleys 13 are disposed below the drive pulley 9. One of the two idler pulleys 13 is arranged in the front side of the drive pulley 9 in the vehicle 1, and the other idler pulley 13 is arranged in the rear side of the drive pulley 9 in the vehicle 1. Both of the two idler pulleys 13 are accommodated in the upper rail 6 in a space defined by the upper rail end portions 61 facing each other in the front-rear direction and the upper rail side portions 62 facing each other in the left-right direction of the upper rail 6 on the right side of the vehicle 1.

The two idler pulleys 13 are preferred examples of a pressing member. One of the two idler pulleys 13 is arranged in the front side of the drive pulley 9 in the vehicle 1 and corresponds to a first pressing member. The other idler pulley 13 is arranged in the rear side of the drive pulley 9 in the vehicle 1 and corresponds to a second pressing member. Also, the member arranged in the rear side in the vehicle 1 may be defined as one corresponding to the first pressing member and the member arranged in the front side in the vehicle 1 may be defined as one corresponding to the second pressing member.

As described above, the seat 5, the upper rail 6, the drive pulley 9, and the two idler pulleys 13 are integrated. Here, since the floor 3 and the lower rail 4 are integrated and the upper rail 6 is movable along the lower rail 4, the seat 5, the upper rail 6, the drive pulley 9, and the two idler pulleys 13 can integrally slide in the front-rear direction of the vehicle 1 to move relative to the floor 3 and the lower rail 4.

The idler pulley 13 is a flat pulley having a flat circumferential surface. Circumferential surface of the idler pulley 13 may be formed of metal, or may be formed of a resin or a rubber composition.

In the present embodiment, the motor 10, the drive pulley 9, the two idler pulleys 13, and the ended belt 12 are disposed only on the right side of the vehicle, but may also be disposed on the left side of the vehicle in a similar configuration.

(Operation of Seat Slide Device 2)

Next, seat slide operation by the seat slide device 2 will be described. When the drive pulley 9 is rotated by the motor 10, the ended belt 12 runs relative to the drive pulley 9. However, the belt does not move since the both ends 121 of the ended belt 12 are fixed to the lower rail 4. Accordingly, a propulsive force in the front-rear direction acts on the seat 5 and the upper rail 6 integrated with the drive pulley 9. As a result, the upper rail 6 moves along the lower rail 4 and the seat 5 slides in the front-rear direction of the vehicle 1.

Figure 4:
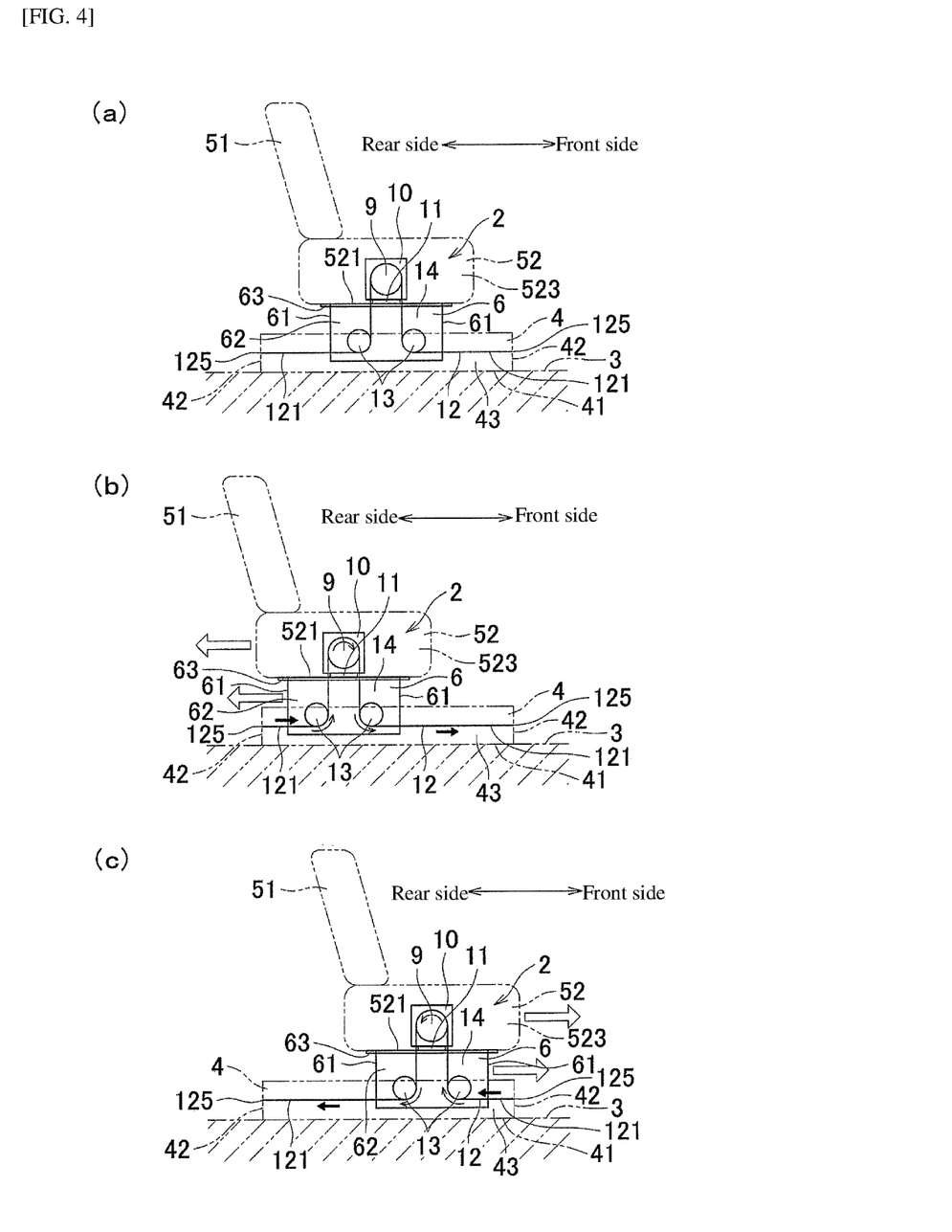
FIG. 4 includes views explaining operation of the seat slide device; (a) of FIG. 4 illustrates a central position of the seat; (b) of FIG. 4 illustrates a rear position of the seat; and (c) of FIG. 4 illustrates a front position of the seat, respectively.

In FIG. 4, (a) illustrates a state in which the second-row seat 5 is just at a central position. When the drive pulley 9 is rotated by the motor 10 in the clockwise direction as illustrated in (b) of FIG. 4 from this state, the seat 5 and the upper rail 6 move rearward. On the other hand, when the motor 10 is rotated in a direction opposite to the direction in (b) of FIG. 4 and the drive pulley 9 is rotated in the counterclockwise direction as illustrated in (c) of FIG. 4, the seat 5 and the upper rail 6 move forward (rightward in the figure). A sliding movement of the seat 5 in the front-rear direction can be switched by switching the rotation direction of the motor 10.

(Function and Effects)

As described above, the seat slide device 2 according to the present embodiment is a seat slide device having a simple configuration mainly using a belt and a pulley. The seat slide device 2 according to the present embodiment is lighter in weight than a conventional configuration in which many mechanical components are used. The seat slide device 2 according to the present embodiment is less likely to generate noise or the like due to contact of metal members. The size of the seat slide device 2 can be reduced since only the ended belt 12 needs to be lengthened even in the case where a moving distance of the seat 5 is long. Unlike the case of using a wire, the drive pulley 9 does not increase in size even in the case where the ended belt 12 is long since the ended belt 12 is not wound around the drive pulley 9 for plural times. Furthermore, the bending fatigue is not a serious problem.

In the drive mechanism of the seat slide device 2 as illustrated in (a) to (c) of FIG. 2, the drive pulley 9, the motor 10, the two idler pulleys 13, and the ended belt 12 that occupy a large part in terms of size are accommodated in the seat 5 or in the upper rail 6. Therefore, a space in which the occupant sits, including a foot space is not narrow.

As illustrated in (a) to (c) in FIG. 2, since the motor 10 is entirely accommodated in the seat 5, noise generated when the motor 10 is operating is blocked by the seat 5 and the quietness is improved. Furthermore, since there are fewer foreign matters in the seat 5 than outside the seat 5, the foreign matters are less likely to enter the motor 10.

As illustrated in (a) to (c) of FIG. 2, since the drive pulley 9 is accommodated in the seat 5, noise generated when the drive pulley 9 is rotating is blocked by the seat 5 and the quietness is improved. Furthermore, since there are fewer foreign matters in the seat 5 than outside the seat 5, the foreign matters are less likely to be caught between the drive pulley 9 and the ended belt 12.

As illustrated in (a) to (c) of FIG. 2, since the two idler pulleys 13 are accommodated in the upper rail 6, contact noise between the idler pulleys 13 and the ended belt 12 or the like generated when the idler pulleys 13 are rotating is blocked by the upper rail 6 and the quietness is improved. Furthermore, since there are fewer foreign matters in the upper rail 6 than outside the upper rail 6, the foreign matters are less likely to be caught between the idler pulleys 13 and the ended belt 12.

In the seat slide device 2 according to the present embodiment, since the idler pulleys 13 are driven to rotate following the movement of the ended belt 12, a resistance between the ended belt 12 and the idler pulleys 13 decreases and the sliding movement of the seat 5 is smooth. Furthermore, wearing of the belt is also reduced.

In the case where the drive pulley and the ended belt are in a combination where the drive pulley is a flat pulley and the ended belt is a flat belt or a combination where the drive pulley is a ribbed pulley engraved with a plurality of V-shaped rib grooves in the circumferential direction of the pulley and the ended belt is a V-ribbed belt, power is transmitted from the drive pulley to the ended belt by friction. However, slippage may occur when power is transmitted from the drive pulley to the ended belt by friction, which is a problem.

In contrast, in the seat slide device 2 according to the present embodiment as illustrated in FIG. 3, the drive pulley 9 is a toothed pulley having a plurality of tooth grooves 92 arranged in the circumferential direction on the circumferential surface, and the ended belt 12 is a toothed belt having a plurality of tooth portions 124 corresponding to the tooth grooves 92 and formed on the surface that is in contact with the drive pulley 9. In the seat slide device 2 according to the present embodiment, the tooth portions 124 of the ended belt 12 mesh with the tooth grooves 92 of the drive pulley 9 so that power can be transmitted from the drive pulley 9 to the ended belt 12 with high power transmission efficiency without slippage and the seat 5 can be smoothly slid.

As illustrated in (b) and (c) of FIG. 2 and FIG. 3, since the winding angle of the ended belt 12 to the drive pulley 9 is 180 degrees, noise generated when the ended belt 12 and the drive pulley 9 come into contact with or separate from each other is reduced and good quietness and durability can be achieved.

The belt width of the ended belt 12 is 80% to 99% of the width of the drive pulley 9. In this manner, by increasing the width of the ended belt 12 as much as possible within a range that does not exceed the width of the drive pulley 9, the transmission power from the drive pulley 9 to the ended belt 12 is increased and the seat 5 is smoothly slid.

In the seat slide device 2 according to the present embodiment, since the belt body of the ended belt 12 is made of a rubber composition, noise generated when the ended belt 12 comes into contact with the drive pulley 9 and the two idler pulleys 13 is reduced and good quietness can be achieved.

In the seat slide device 2 according to the present embodiment as illustrated in (a) to (c) of FIG. 2, the ended belt 12 is entirely accommodated in the space 14 surrounded by the seat 5, the upper rail 6, and the lower rail 4. In the case where the ended belt 12 is partially not accommodated in the space 14 surrounded by the seat 5, the upper rail 6, and the lower rail 4, that is, in the case where the ended belt 12 includes a portion that is not inside the seat 5, the upper rail 6, nor the lower rail 4, foreign matters may adhere to the ended belt 12 and the foreign matters may enter the space 14 surrounded by the seat 5, the upper rail 6, and the lower rail 4. However, since the ended belt 12 is entirely accommodated in the space 14 surrounded by the seat 5, the upper rail 6, and the lower rail 4, foreign matters are less likely to enter the space 14 surrounded by the seat 5, the upper rail 6, and the lower rail 4.

Figure 7:
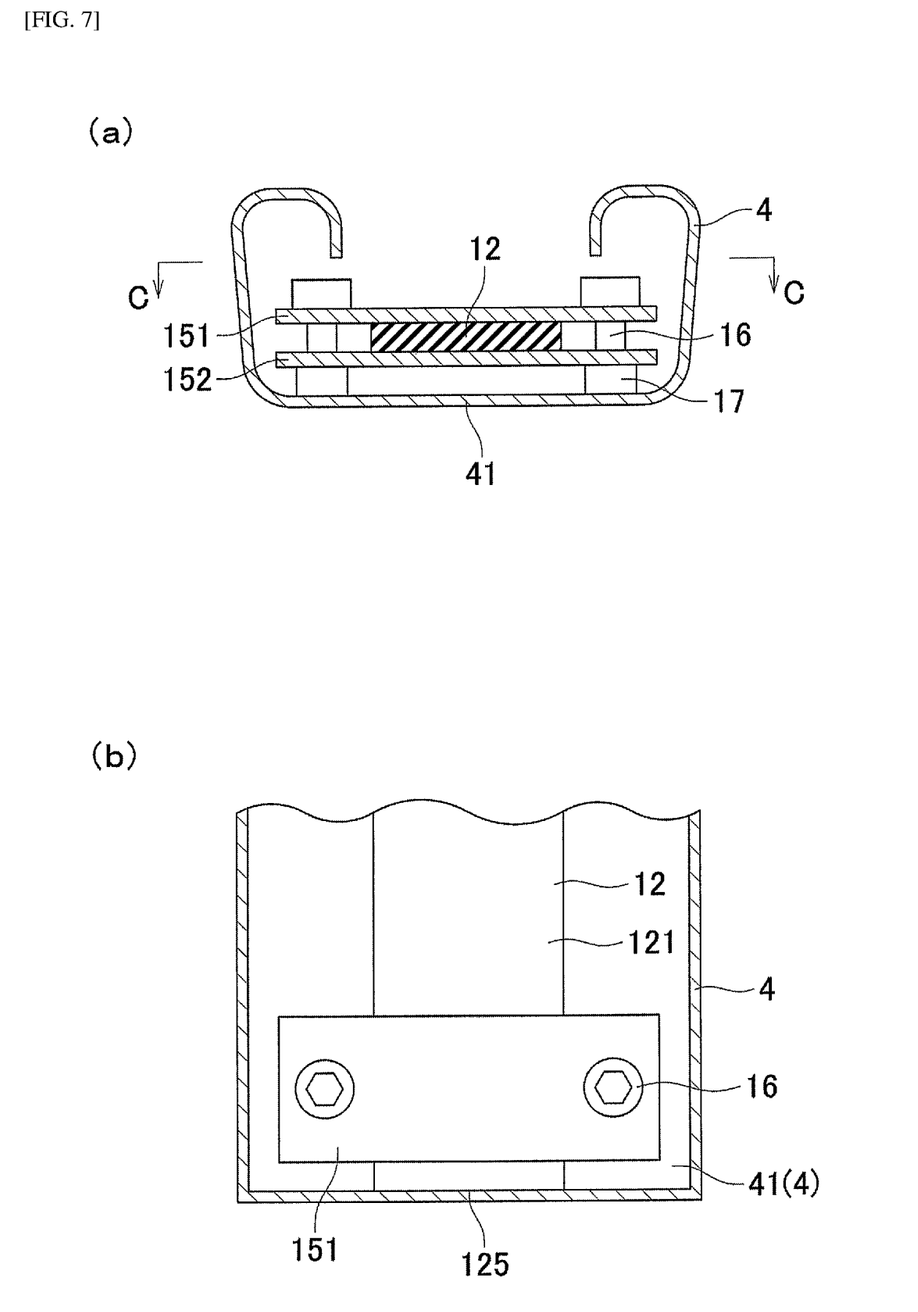
FIG. 7 includes views illustrating the sheet slide device according to the present embodiment; (a) of FIG. 7 is a partially-enlarged view of a cross-sectional view taken along a line B-B in (b) of FIG. 2; and (b) of FIG. 7 is a cross-sectional view taken along a line C-C in (a) of FIG. 7.

The fixing of the ended belt 12 to the lower rail 4 will be described. For example, the both ends 121 of the ended belt 12 may be fixed to the lower rail 4 as described below. As illustrated in (a) and (b) in FIG. 7, each of the both ends 121 of the ended belt 12 is sandwiched by an upper plate 151 and a lower plate 152. On each of left and right sides of each of the both ends 121 of the ended belt 12, a bolt 16 having a male screw is inserted into a hole having a female screw formed in the upper plate 151 and into a hole having a female screw formed in the lower plate 152 in such a manner that the bolt 16 does not penetrate the ended belt 12. A nut 17 is fitted to a lower end of the bolt 16. The nut 17 is fixed to a surface of the lower rail bottom portion 41 of the lower rail 4 that is inside the lower rail 4 by welding. The upper plate 151 and the lower plate 152 are made of metal, for example.

(Modifications)

While a preferred embodiment of the present invention has been described above, the embodiment described above can be modified as follows.

Figure 5:
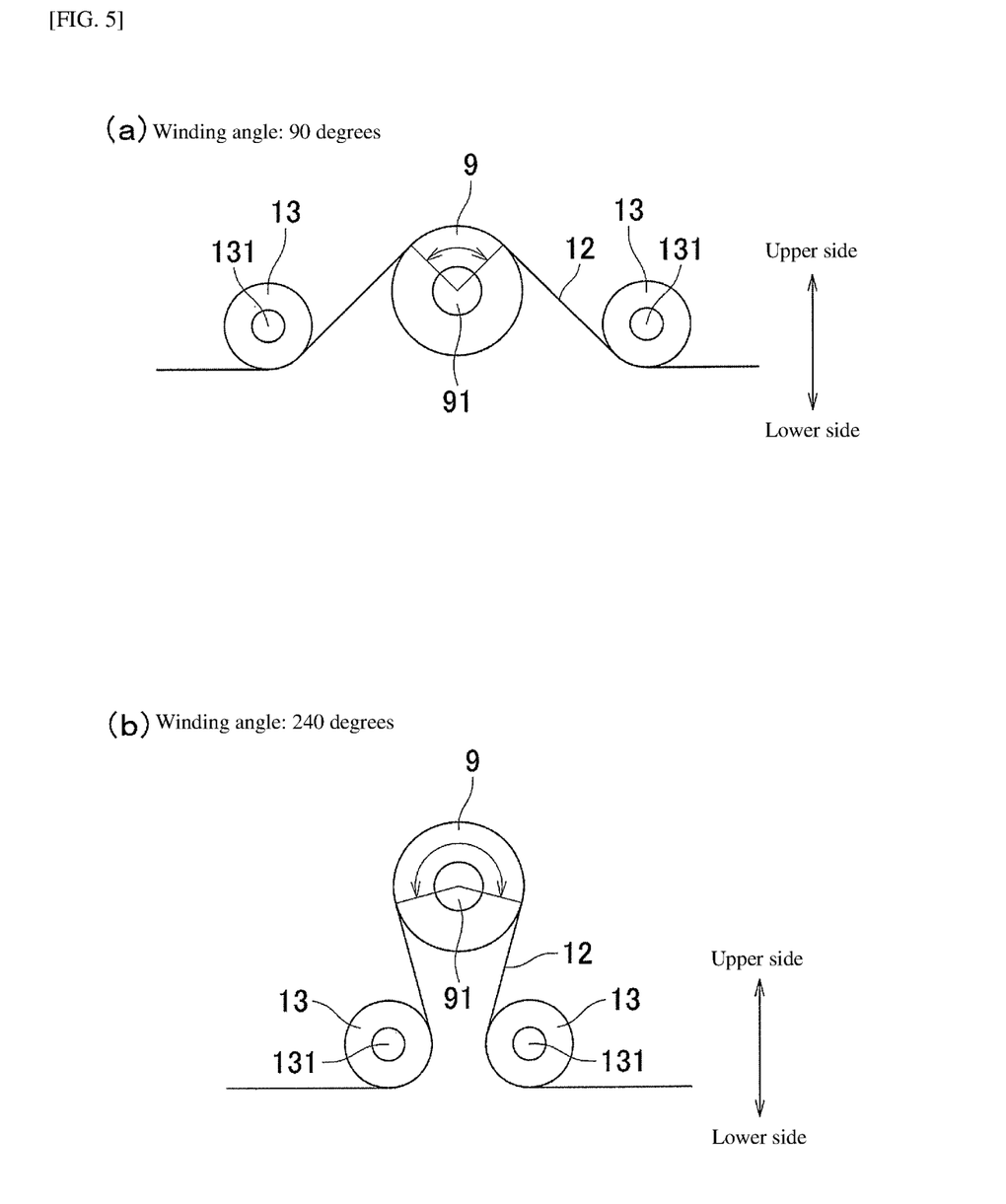
FIG. 5 illustrates other examples of a winding angle of the drive pulley.

(1) The winding angle of the ended belt 12 to the drive pulley 9 may be not 180 degrees. From a viewpoint of increasing the transmission power from the drive pulley 9 to the ended belt 12, the winding angle is preferably large and is preferably 90 degrees or more. From a viewpoint of preventing noise generated when the ended belt 12 and the drive pulley 9 come into contact with or separate from each other and improving the quietness and the durability, the winding angle is preferably small and is preferably 240 degrees or less. In FIG. 5, (a) illustrates a state in which the ended belt 12 is wound around the drive pulley 9 at a winding angle of the ended belt 12 to the drive pulley 9 being 90 degrees, and (b) illustrates a state in which the ended belt 12 is wound around the drive pulley 9 at a winding angle of the ended belt 12 to the drive pulley 9 being 240 degrees.

(2) A pressing member may not be an idler pulley as long as it comes into contact with the surface of the ended belt. For example, a pulley that does not rotate may be used.

(3) The idler pulley may be used in a fixed position and may be a fixed tensioner or auto-tensioner that adjusts a tension of the wound belt. The auto-tensioner is a device that uses a spring or the like and automatically adjusts the tension of the wound belt by displacing a position of a pulley around which the belt is wound.

(4) The seat slide device may include three or more pressing members. For example, the seat slide device may include four fixed tensioners, each two fixed tensioners of which may be provided on a corresponding side in the front and rear side of the drive pulley 9. Accordingly, even in the case where the moving distance of the seat 5 is long and the length of the ended belt 12 is large, the tension of the ended belt 12 is adjusted halfway by the fixed tensioners so that the ended belt 12 is less likely to sag.

(5) Although the drive pulley 9 is attached to the seat 5 in the above-mentioned embodiment, the drive pulley 9 may also be attached to the upper rail 6 that moves integrally with the seat 5.

(6) Although the both ends 121 of the ended belt 12 are fixed to the lower rail 4 in the above-mentioned embodiment, fixed positions of the both ends 121 of the ended belt 12 are not limited to the lower rail 4. For example, a metal fitting may be fixed near the lower rail 4 on the floor 3 and the both ends 121 of the belt 12 may be fixed to the metal fitting.

Figure 8:
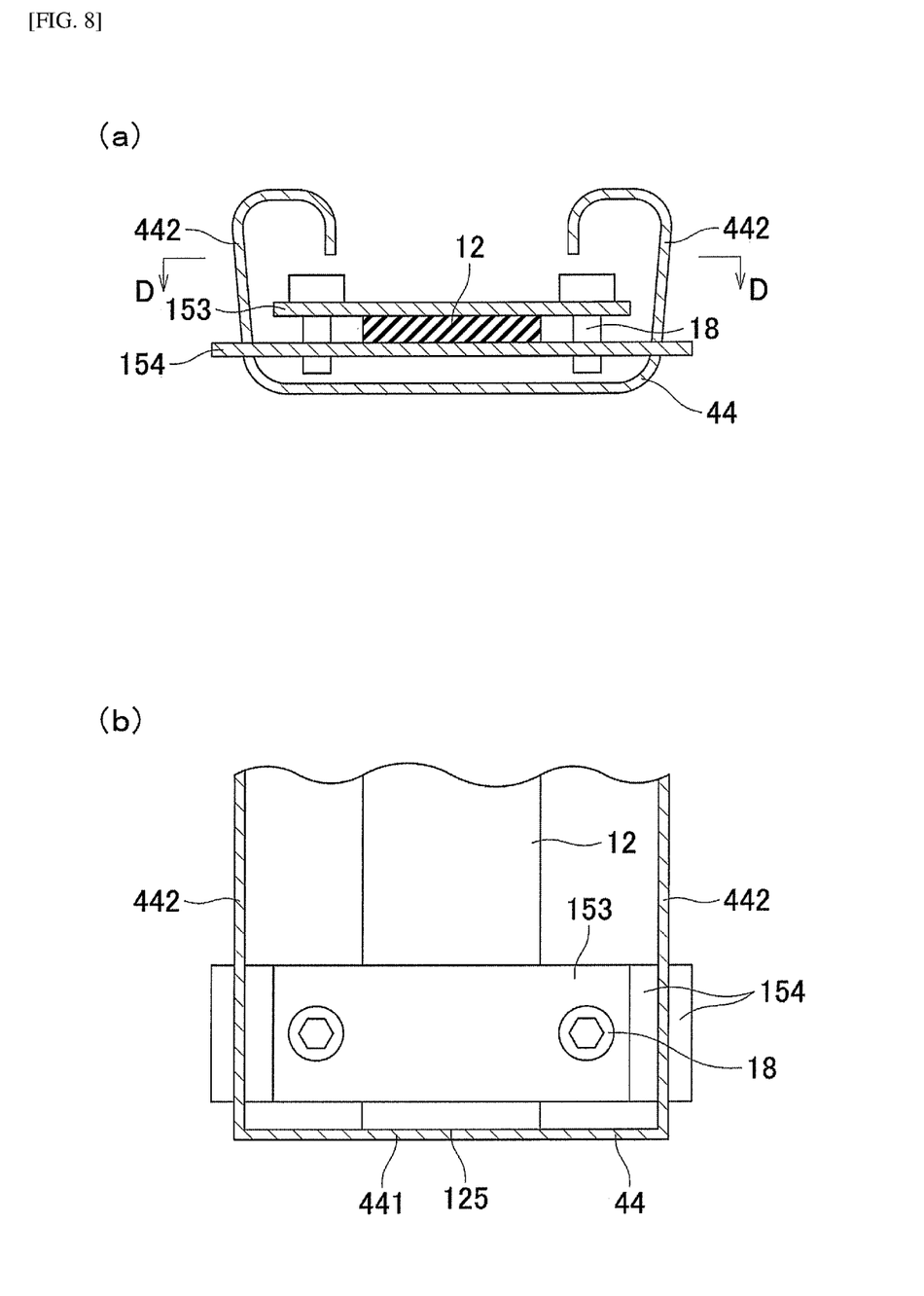
FIG. 8 includes views illustrating a sheet slide device according to a modification embodiment; (a) of FIG. 8 is a partially-enlarged view of a cross-sectional view taken along the line B-B in (b) of FIG. 2; and (b) of FIG. 8 is a cross-sectional view taken along the line D-D of (a) of FIG. 8.

(7) As illustrated in (a) and (b) of FIG. 8, the both ends 121 of the ended belt 12 may be fixed to a lower rail 44. That is, both ends of each of two lower plates 154 in the left-right direction of the vehicle pass through a corresponding vicinity of two lower rail end portions 441 facing each other in the front-rear direction of the lower rail 4 on both sides of two lower rail side portions 442 facing each other in the left-right direction of the lower rail 44. The two lower plates 154 are fixed to the lower rail 44. Each of the both ends 121 of the ended belt 12 is sandwiched between an upper plate 153 and the lower plate 154. On each of left and right sides of each of the both ends 121 of the ended belt 12, a bolt 18 having a male screw is inserted into a hole having a female screw formed in the upper plate 153 and into a hole having a female screw formed in the lower plate 154, in such a manner that the bolt 18 does not penetrate the ended belt 12.

(8) The idler pulley 13 may be attached to the seat 5. Two idler pulleys 13 may be both attached to the seat 5 or only one of the idler pulleys 13 may be attached to the seat 5.

Other Embodiments

The following configuration in which attachment positions of a drive pulley and two idler pulleys are changed in the above-described embodiment, can be employed.

Figure 6:
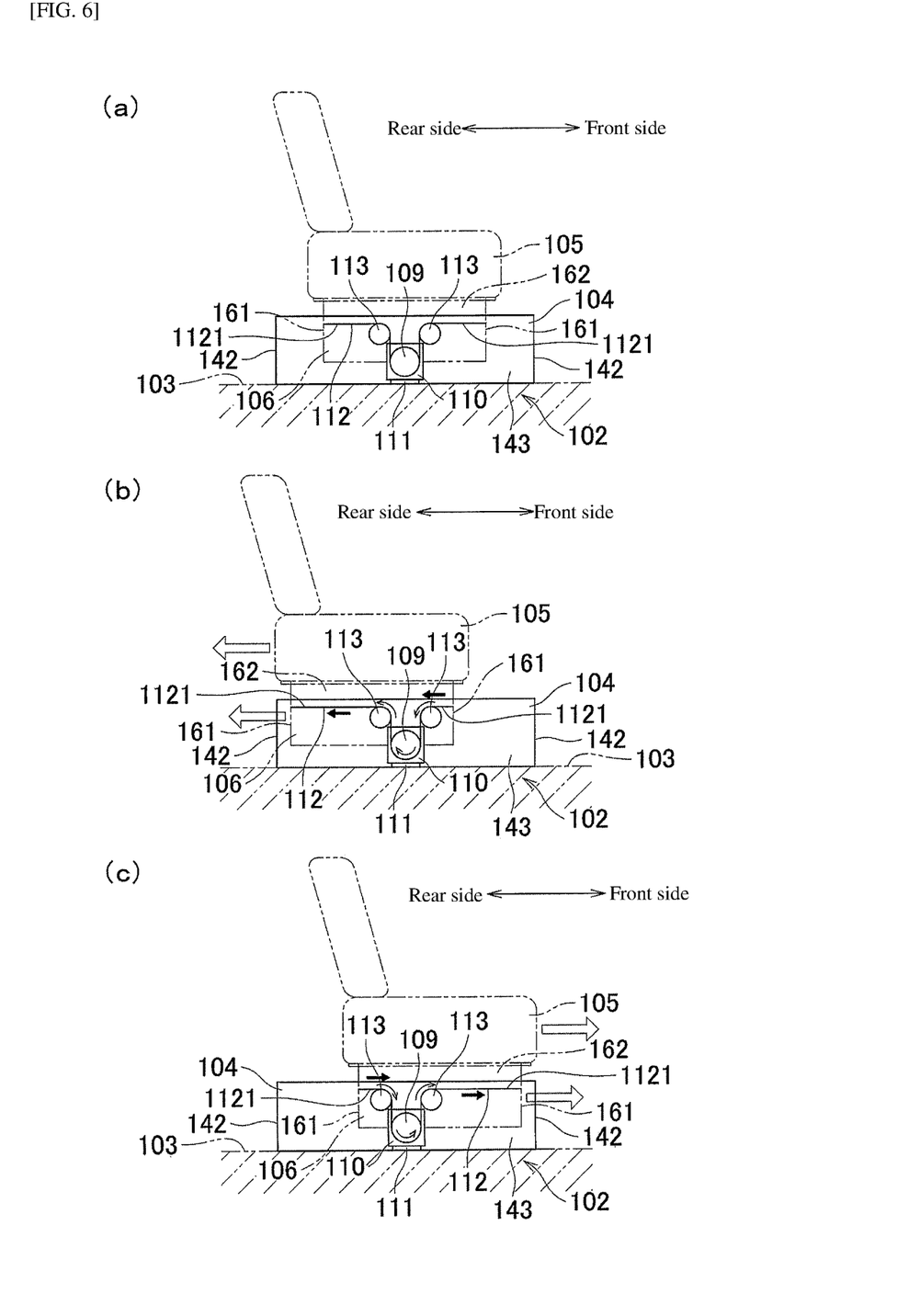
FIG. 6 includes views explaining operation of a seat slide device according to another embodiment and corresponds to FIG. 4.

As illustrated in (a) to (c) of FIG. 6, a motor 110 is attached to a floor 103 via a bracket 111. A drive pulley 109 is rotatably attached to the floor 103 via the motor 110. The motor 110 and the drive pulley 109 are accommodated in a lower rail 104 in a space defined by lower rail end portions 142 facing each other in the front-rear direction and lower rail side portions 143 facing each other in the left-right direction in the lower rail on the right side, or accommodated in an upper rail 106 in a space defined by upper rail end portions 161 facing each other in the front-rear direction and upper rail side portions 162 facing each other in the left-right direction in the upper rail on the right side. The motor 110 and the drive pulley 109 are disposed at a center of the lower rail 104 on the right side in the front-rear direction of the vehicle.

As illustrated in (a) to (c) of FIG. 6, each of both ends of a rotation shaft of two idler pulleys 113 is fixed to a corresponding one of the lower rail side portions 143 facing each other in the left-right direction of the lower rail 104 on the right side of the vehicle. The two idler pulleys 113 are rotatably attached to the lower rail 104. Both of the two idler pulleys 113 are accommodated in the lower rail 104 in a space defined by the lower rail end portions 142 facing each other in the front-rear direction and the lower rail side portions 143 facing each other in the left-right direction in the lower rail 104 on the right side. Both of the two idler pulleys 113 are disposed above the drive pulley 109. One of the two idler pulleys 113 is arranged in the front side of the drive pulley 109 in the vehicle, and the other idler pulley 113 is arranged in the rear side of the drive pulley 109 in the vehicle.

As illustrated in (a) to (c) of FIG. 6, each of both ends 1121 of an ended belt 112 is fixed to a corresponding one of the two upper rail end portions 161 facing each other in the front-rear direction of the vehicle of the upper rail 106. The ended belt 112 has a configuration upside down of the above-described embodiment, and has an upper surface that has a plurality of tooth portions corresponding to tooth grooves formed on a circumferential surface of the drive pulley 109, and a lower surface that is a flat surface. The toothed portions on the upper surface of the ended belt 112 mesh with the tooth grooves on the circumferential surface of the drive pulley 109. The ended belt 112 is in contact with the two idler pulleys 113 on the lower surface.

Next, seat slide operation by the seat slide device 102 will be described. When the drive pulley 109 is rotated by the motor 110, the upper rail 106, to which the both ends 1121 of the ended belt 112 are fixed, slides integrally with a seat 105 along the lower rail 104 in the front-rear direction of the vehicle.

In FIG. 6, (a) illustrates a state in which the second-row seat 105 is just at a central position. When the drive pulley 109 is rotated by the motor 110 in a clockwise direction as illustrated in (b) of FIG. 6 from this state, the seat 105 and the upper rail 106 move rearward. On the other hand, when the motor 110 is rotated in a direction opposite to the direction in (b) of FIG. 6 and the drive pulley 109 is rotated in a counterclockwise direction as illustrated in (c) of FIG. 6, the seat 105 and the upper rail 106 move forward (rightward in the figure). A sliding movement of the seat 105 in the front-rear direction can be switched by switching the rotation direction of the motor 110.

The configuration according to this embodiment can also obtain the same effect as that of the seat slide device 2 according to the above-described embodiment. Specific effects according to this embodiment that are not obtained by the above-described embodiment will be described below.

In the seat slide device 102 according to this embodiment as illustrated in (a) to (c) of FIG. 6, since the motor 110 is entirely accommodated in the upper rail 106 or in the lower rail 104, noise generated when the motor 110 is operating is blocked by the upper rail 106 and the lower rail 104 and the quietness is improved. Furthermore, since there are fewer foreign matters in the upper rail 106 or the lower rail 104 than outside, the foreign matters are less likely to enter the motor 110.

In the seat slide device 102 according to this embodiment as illustrated in (a) to (c) of FIG. 6, since the drive pulley 109 is accommodated in the upper rail 106 or in the lower rail 104, noise generated when the drive pulley 109 is rotating is blocked by the upper rail 106 and the lower rail 104 and the quietness is improved. Furthermore, since there are fewer foreign matters in the upper rail 106 or the lower rail 104 than outside, the foreign matters are less likely to be caught between the drive pulley 109 and the ended belt 112.

Although the present invention has been described in detail with reference to specific embodiments, it is obvious to those skilled in the art that various changes and modifications may be made without departing from the gist and the scope of the present invention.

This application is based on Japanese Patent Application No. 2018-087270 filed on Apr. 27, 2018, and Japanese Patent Application No. 2019-077064 filed on Apr. 15, 2019, contents of which are incorporated by reference herein.

REFERENCE SIGNS LIST 1 vehicle
2 seat slide device
3 floor
4 lower rail
5 seat
6 upper rail
9 drive pulley
10 motor
11 bracket
12 ended belt
13 idler pulley (pressing member)

The invention claimed is:

1. A seat slide device, comprising:
a lower rail fixed on a floor and extending in one direction;
an upper rail coupled to a seat and movable along the lower rail;
a drive pulley connected to a drive source and attached to the seat or the upper rail;
an ended belt wound around the drive pulley so that one surface of the ended belt is in contact with the drive pulley, and having both ends fixed to the floor or the lower rail; and
a first pressing member and a second pressing member that are attached to positions closer to the floor than the drive pulley in the seat or the upper rail, and are both in contact with another surface of the ended belt,
wherein the first pressing member, the drive pulley, and the second pressing member are arranged in this order in the one direction,
wherein the ended belt is configured to move the seat and the upper rail integrally with respect to the lower rail, and the ended belt is a toothed belt having a plurality of tooth portions arranged in a circumferential direction on the one surface to transmit power,
wherein the ended belt is entirely accommodated in a space surrounded by the seat, the upper rail, and the lower rail, and
wherein the ended belt has a winding angle, which is formed around the drive pulley from the first pressing member to the second pressing member, between 180 degrees and 240 degrees inclusive, and the distance between the first pressing member and the second pressing member is equal to or less than the diameter of the drive pulley.

2. The seat slide device according to claim 1, wherein the drive source is entirely accommodated in the seat.

3. The seat slide device according to claim 1, wherein the drive source is a motor, and a sliding movement of the seat in the one direction is switched by switching a rotation direction of the motor.

4. The seat slide device according to claim 1, wherein the drive pulley is accommodated in the seat.

5. The seat slide device according to claim 1, wherein the first pressing member and the second pressing member are accommodated in the upper rail.

6. The seat slide device according to claim 1, wherein the first pressing member and the second pressing member are idler pulleys that are driven to rotate following a movement of the ended belt.

7. The seat slide device according to claim 1, wherein the ended belt has a belt body formed of a rubber composition.

8. The seat slide device according to claim 1,
wherein the drive pulley has a plurality of tooth grooves arranged in a circumferential direction on a circumferential surface of the drive pulley, and
the plurality of tooth portions correspond to the tooth grooves, formed on a surface that is in contact with the drive pulley.

9. The seat slide device according to claim 1, wherein the ended belt has a width of 80% or more and 99% or less of a width of the drive pulley.

10. The seat slide device according to claim 1, further comprising a lock mechanism that restricts a sliding movement of the seat.

11. A seat slide device, comprising:
a lower rail fixed on a floor and extending in one direction;
an upper rail coupled to a seat and movable along the lower rail;
a drive pulley connected to a drive source and attached to the floor or the lower rail;
an ended belt wound around the drive pulley so that one surface of the ended belt is in contact with the drive pulley, and having both ends fixed to the seat or the upper rail; and
a first pressing member and a second pressing member that are attached to positions closer to the seat than the drive pulley on the floor or the lower rail, and are both in contact with another surface of the ended belt,
wherein the first pressing member, the drive pulley, and the second pressing member are arranged in this order in the one direction,
wherein the ended belt is configured to move the seat and the upper rail integrally with respect to the lower rail, and the ended belt is a toothed belt having a plurality of tooth portions arranged in a circumferential direction on the one surface to transmit power,
wherein the ended belt is entirely accommodated in a space surrounded by the seat, the upper rail, and the lower rail, and
wherein the ended belt has a winding angle, which is formed around the drive pulley from the first pressing member to the second pressing member, between 180 degrees and 240 degrees inclusive, and the distance between the first pressing member and the second pressing member is equal to or less than the diameter of the drive pulley.

12. The seat slide device according to claim 10, wherein the lock mechanism further includes a claw member rotatably attached to an outer surface of the upper rail and a plurality of lock holes formed at equal intervals along the lower rail.

13. The seat slide device according to claim 12, wherein an end portion of the claw member is received into a lock hole of the plurality of lock holes to prevent movement of the upper rail relative to the lower rail.

14. The seat slide device according to claim 11, wherein the ended belt is wound around only a portion of the drive pulley.

15. The seat slide device according to claim 1, wherein the ended belt is wound around only a portion of the drive pulley.

* * * * *